United States Patent
Bastier

(10) Patent No.: US 9,353,839 B2
(45) Date of Patent: May 31, 2016

(54) ACTUATING DEVICE FOR THE ROTATION OF A TURBINE SHAFT TRAIN

(71) Applicant: ALSTOM Technology Ltd, Baden (CH)

(72) Inventor: Arnaud Bastier, Bourg la Reine (FR)

(73) Assignee: ALSTOM TECHNOLOGY LTD, Baden (CH)

( * ) Notice: Subject to any disclaimer, the term of this patent is extended or adjusted under 35 U.S.C. 154(b) by 281 days.

(21) Appl. No.: 13/726,941

(22) Filed: Dec. 26, 2012

(65) Prior Publication Data

US 2013/0167679 A1    Jul. 4, 2013

(30) Foreign Application Priority Data

Dec. 29, 2011  (FR) .................................... 11 62552

(51) Int. Cl.
| | |
|---|---|
| *F16H 35/00* | (2006.01) |
| *F16H 1/06* | (2006.01) |
| *F01D 25/34* | (2006.01) |
| *F01D 25/36* | (2006.01) |
| *F16H 31/00* | (2006.01) |
| *F15B 15/06* | (2006.01) |

(52) U.S. Cl.
CPC ................ *F16H 35/00* (2013.01); *F01D 25/34* (2013.01); *F01D 25/36* (2013.01); *F16H 1/06* (2013.01); *F16H 31/005* (2013.01); *F05B 2220/301* (2013.01); *F05B 2260/85* (2013.01); *F05D 2220/31* (2013.01); *F05D 2260/85* (2013.01); *F15B 15/061* (2013.01); *Y10T 74/19637* (2015.01); *Y10T 74/19642* (2015.01)

(58) Field of Classification Search
CPC .......... F01D 25/34; F01D 25/36; F16H 1/06; F16H 31/005; F16H 35/00; F05B 2260/85
USPC ................ 74/126, 128, 130; 60/39.08; 91/53; 81/57.39
See application file for complete search history.

(56) References Cited

U.S. PATENT DOCUMENTS

| | | | |
|---|---|---|---|
| 3,141,384 A | | 7/1964 | Hoffman |
| 3,791,231 A | | 2/1974 | Geary |
| 4,018,094 A | * | 4/1977 | Schmidt .......................... 74/128 |
| 4,090,409 A | | 5/1978 | Ohleyer |
| 4,211,070 A | * | 7/1980 | Portmann .................... 60/39.08 |
| 4,336,727 A | * | 6/1982 | Junkers ........................ 81/57.39 |

(Continued)

FOREIGN PATENT DOCUMENTS

| | | |
|---|---|---|
| CN | 201461005 U | 5/2010 |
| CN | 201581942 U | 9/2010 |

(Continued)

OTHER PUBLICATIONS

Office Action issued on Aug. 22, 2014, by the Russian Patent Office in Russian Patent Application No. 2012157282, and an English translation of the Office Action (11 pages).

(Continued)

*Primary Examiner* — William C Joyce
(74) *Attorney, Agent, or Firm* — Buchanan Ingersoll & Rooney PC

(57) ABSTRACT

An actuating device is provided for the rotation of a turbine shaft train and includes a principal turning gear electrically operated and an auxiliary turning gear hydraulically operated. Also provided is a turbine-generator set for the generation of electricity including the actuating device.

6 Claims, 6 Drawing Sheets

(56) References Cited

U.S. PATENT DOCUMENTS 4,458,563 A * 7/1984 Bickford et al. ............. 81/57.39
4,919,039 A   4/1990 Nutter

FOREIGN PATENT DOCUMENTS

| CN | 202081924 U | 12/2011 |
| CN | 202300553 U | 7/2012 |
| FR | 887535 A | 11/1943 |
| FR | 2284804 A1 | 7/1976 |
| FR | 2329846 A1 | 5/1977 |
| GB | 762577 A | 11/1956 |
| JP | 56014809 A | 2/1981 |
| JP | 2000-337105 A | 12/2000 |
| KR | 10-2011-0138847 | * 12/2011 |
| SU | 168730 A1 | 11/1965 |
| WO | 2012059471 A | 5/2012 |

OTHER PUBLICATIONS

First Office Action issued Mar. 30, 2015, by the Chinese Patent Office in corresponding Chinese Patent Application No. 201310063321.1, and an English translation of the Office Action.

* cited by examiner

ACTUATING DEVICE FOR THE ROTATION OF A TURBINE SHAFT TRAIN

INCORPORATION BY REFERENCE

The following documents are incorporated herein by reference as if fully set forth: French Patent Application No. 1162552, filed Dec. 29, 2011.

FIELD OF INVENTION

The present invention relates to the field of turbine-generator sets. It concerns steam turbines in particular, although it could also be applied to gas turbines. Turbines of this kind are utilized in electricity generation plants, each turbine driving an alternator for generating electricity. This may be a plant operating on the basis of energy of fossil or nuclear origin.

BACKGROUND

More particularly, the invention relates to an actuating device for causing a turbine shaft train to rotate. The shaft train comprises the rotors of each turbine module, as well as that of the alternator. The rotation of the shaft train, also referred to as turning, is generally achieved with the help of an electric motor capable of overcoming the resistive torque of the shaft train. The electric motor drives a reduction gear which actuates the shaft train. It is necessary to maintain the rotation of the shaft train during periods of starting and stopping the turbine-generator set in order to equalize the temperatures of the rotor and thereby to avoid any bending of the shaft train under the effect of thermal dissymmetry. The electric motor also allows the rotation of the shaft train to be initiated during a starting phase ahead of the injection of steam into the turbine. The speed of rotation of the shaft train is low and constant during these phases. It varies from a few revolutions per minute to a few tens of revolutions per minute depending on the turbine-generator sets concerned.

However, a turning gear controlled by an electric motor does not allow a very low speed of rotation to be achieved, or the low-amplitude angular displacements of the shaft train that are necessary during maintenance operations.

The object of the present invention is thus to overcome these disadvantages by proposing an actuating device for a turbine shaft train as well as a turbine-generator set.

SUMMARY

The present disclosure is directed to an actuating device, for rotating a turbine shaft train. The device includes an electrically operated principal turning gear, and a hydraulically operated auxiliary turning gear.

The present disclosure is also directed to a turbine-generator set for the generation of electricity including the above actuating device.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Introduction to the Embodiments

According to a first characteristic, the actuating device for causing the turbine shaft train to rotate comprises an electrically operated principal turning gear and a hydraulically operated auxiliary turning gear. The auxiliary turning gear permits the achievement of angular displacements of the shaft train that are controlled and of low amplitude. The auxiliary turning gear exhibits the advantage that it is possible in this way to have an emergency turning gear at one's disposal in the event of failure of the principal turning gear. It also permits the inertia of the shaft train to be overcome and the latter to be released from the bearings. In addition, it is possible to position the auxiliary turning gear at any point on the shaft train, which allows considerable flexibility in the layout of the plant.

According to one particular characteristic, the auxiliary turning gear is controlled by the rod of a double-acting hydraulic cylinder. This characteristic permits the rotation of the shaft train to be controlled precisely.

According to another characteristic, the auxiliary turning gear comprises a wheel that is integral with the shaft train and an actuator connected to the rod of the cylinder, the actuator being capable of engaging driving means arranged on the periphery of the wheel and being capable of displacement between a retracted position disengaged from the wheel and a position of engagement with one of the driving means, in which an extension movement of the rod of the cylinder controls the rotation of the wheel.

The invention also relates to a turbine-generator set for the generation of electricity comprising an actuating device having all or some of the aforementioned characteristics.

DETAILED DESCRIPTION

Figure 1:
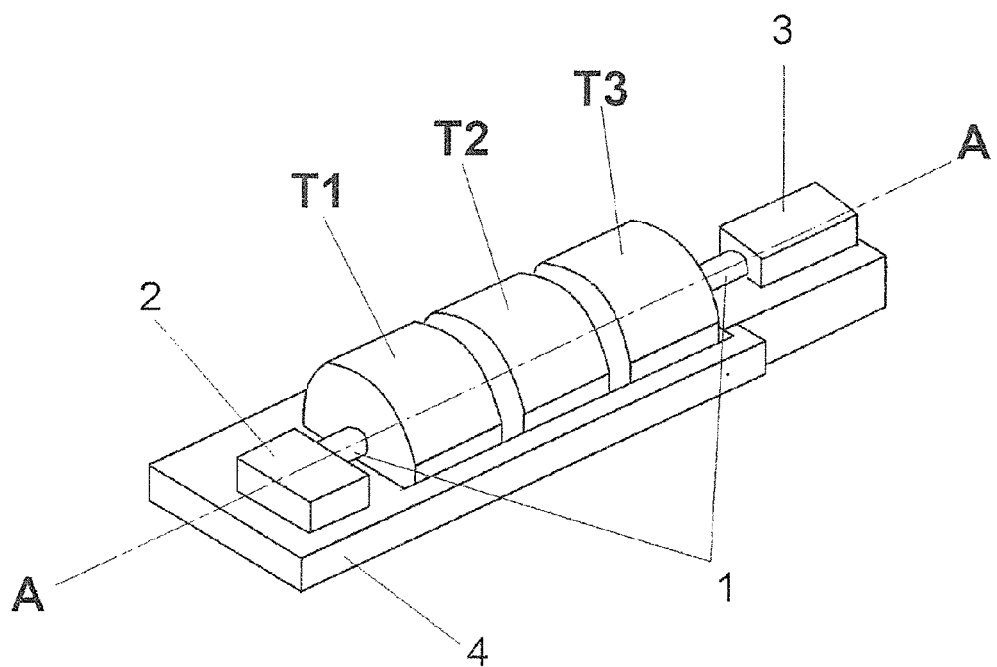
FIG. 1 is a perspective view of a turbine-generator set for the generation of electricity according to the invention.
Figure 2:
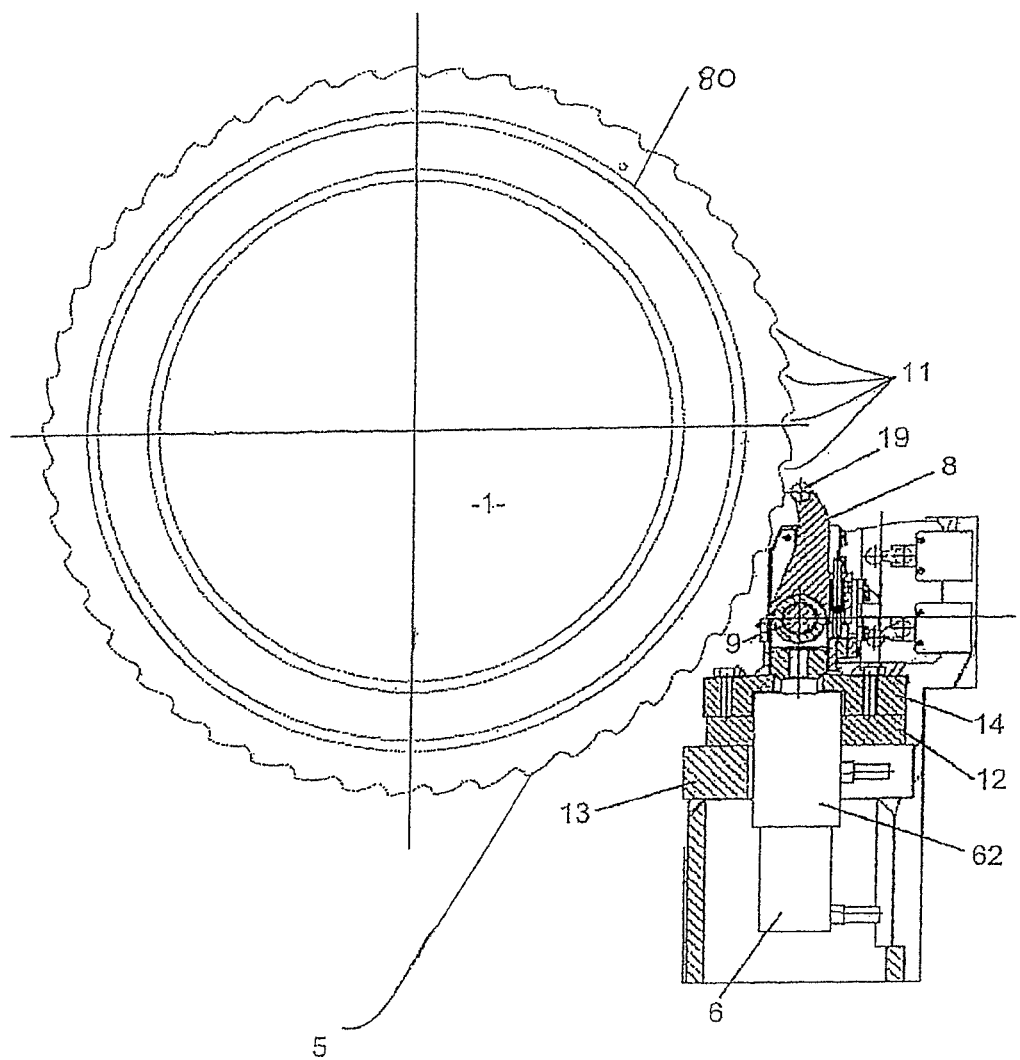
FIG. 2 depicts the auxiliary turning gear according to the invention.

FIG. 1 depicts a turbine-generator set for the generation of electricity comprising a group of steam turbine modules, in this case being three turbine modules T1, T2, T3, driving an alternator 3. This turbine-generator set rests on a rigid supporting structure 4, generally made of concrete. The rotors of the turbine modules drive the alternator 3 causing it to rotate about the shaft A, the alternator being situated behind the turbine-generator set. The shaft train 1 extends forwards, at its opposite extremity to the alternator 3, as far as a housing comprising an actuating device consisting on the one hand of a principal turning gear 80 and on the other hand of an auxiliary turning gear. The principal electrically operated turning gear is actuated by an electric motor permitting the shaft train 1 to be driven via a clutch system. The auxiliary turning gear 5 illustrated in FIG. 2 has hydraulic control by means of a cylinder 6. The auxiliary turning gear permits the shaft train to be caused to rotate through small portions of an angle and the shaft train to be positioned accurately during maintenance operations. It also permits the shaft train to be caused to rotate at a constant speed of a few revolutions per hour. The auxiliary turning gear can serve as an emergency turning gear in the event of failure of the principal turning gear 80, and particularly in the case of its turning for the stopping phase. The auxiliary turning gear will preferably perform a discontinuous rotation. A step-by-step rotation is preferable in this case. Its angle will be in the order of 5 to 10 degrees. Its speed of rotation will favorably lie in the range between 1 and 10 revolutions/hour.

As far as the principal turning gear is concerned, its rotation will preferably be continuous. Its speed of rotation will favorably lie in the range between 1 and 100 revolutions/minute.

The speed of rotation of the principal turning gear will favorably be higher than that of the auxiliary turning gear. The speed of the auxiliary turning gear will thus permit the maintenance operations and will, in particular, make it possible to cause the rotor to rotate at a desired angle.

In the course of the generation of electricity, the shaft train is disconnected from the principal turning gear and from the auxiliary turning gear. Both the principal turning gear and the auxiliary turning gear may be positioned between two turbine modules (T1, T2, T3) or between the final turbine module (T3) and the alternator 3.

The auxiliary turning gear 5 (FIG. 2) is controlled by the rod 61 (FIG. 3) of the hydraulic cylinder 6, which is a double-acting cylinder. The auxiliary turning gear comprises a wheel 10 that is integral with the shaft train 1 and an actuator 8 connected to the rod 61 of the cylinder 6. The actuator 8 is capable of engaging drive members or driving means 11 arranged on the periphery of the wheel. Each drive member 11 exhibits a hollow part 110 adapted to receive a complementary form 19 of the actuator 8. The hollow part 110 and the form 19 have complementary cylindrical forms in order to ensure satisfactory engagement. The actuator 8 is connected via an articulation 9 to the rod 61 of the cylinder 6. Because of the cylinder 6, the actuator 8 is capable of displacement between a retracted position disengaged from the wheel 10 (FIGS. 2 and 5a) and an engagement position with the drive member 11 (FIG. 5b). In the engagement position, the extension movement of the rod 61 from the cylinder 6 controls the rotation of the wheel 10 and consequently that of the shaft train 1. The amplitude of the rotation is controlled with precision by the displacement of the cylinder rod 61. The body of the cylinder 62 is fixed to a carrier plate 12, which is itself fixed to a component 14. The whole assembly is fixed to the component 13 that is connected rigidly to the supporting structure 4, advantageously at the level of a housing.

Figure 3A:
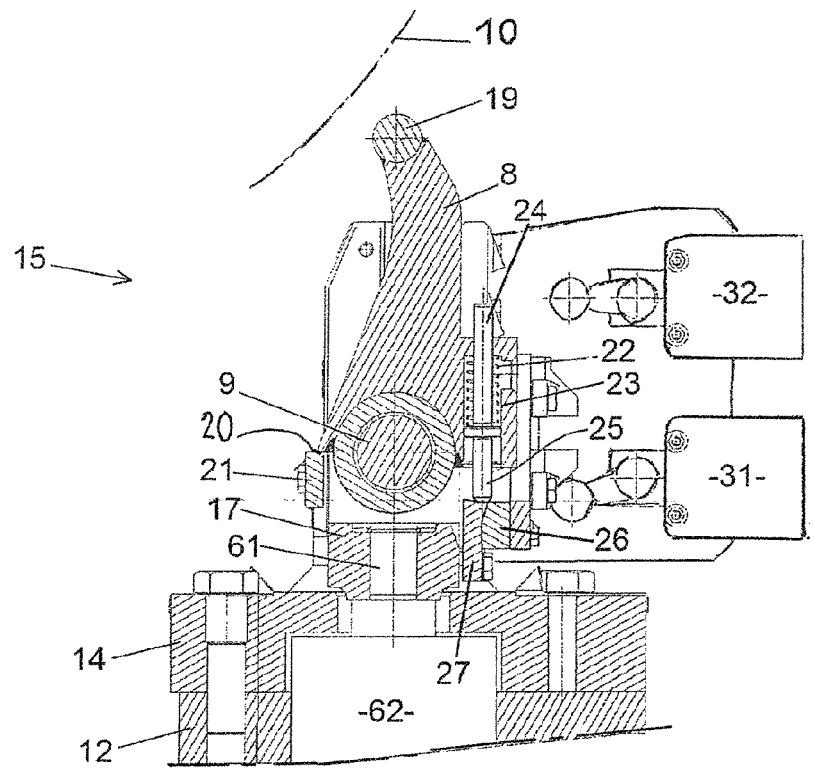
FIG. 3a depicts the actuator for the auxiliary turning gear according to section IIIa in FIG. 3b.
Figure 3B:
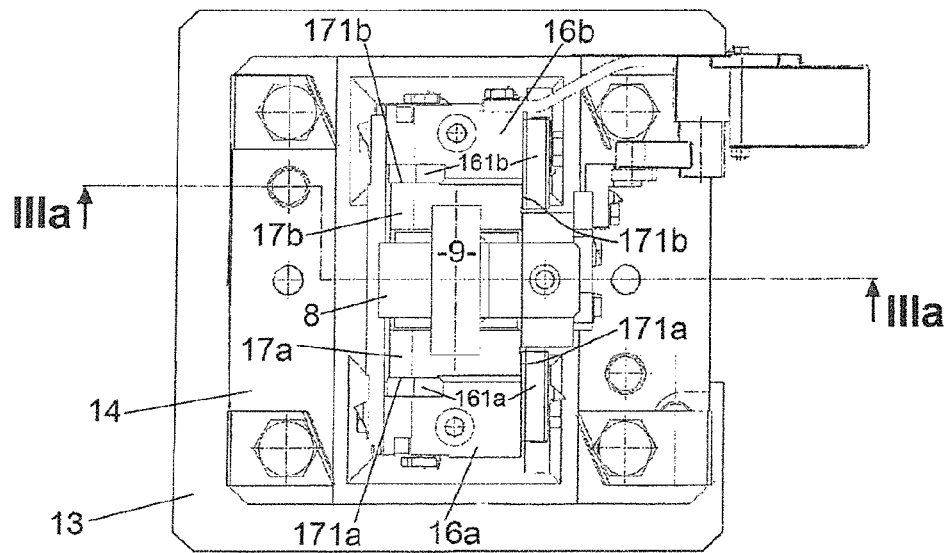
FIG. 3b depicts the actuator of the auxiliary turning gear in plan view.
Figure 4:
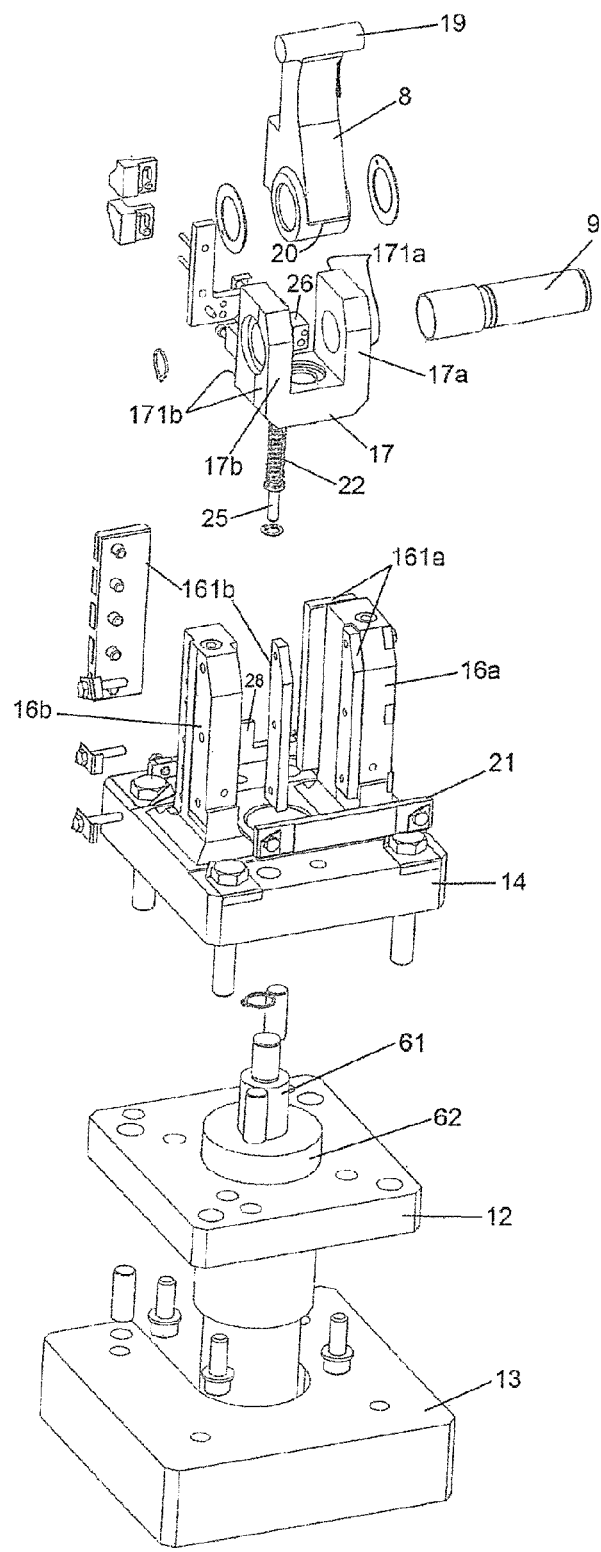
FIG. 4 depicts the actuator in perspective and as an exploded view.

The carrier plate 12 supports the actuating mechanism 15 for the auxiliary turning gear 5, which is illustrated in detail in FIGS. 3a, 3b and 4. The actuating mechanism 15 is supported by a plate 14 fixed by means of screws to the carrier plate 12. The plate 14 exhibits two columns 16a, 16b provided with guides or guiding means 161a, 161b for a slide 17 that is integral with the rod 61 of the cylinder 6. The actuator 8 is connected to the rod of the cylinder by means of an articulation comprising a shaft 9 supported by the slide 17 in such a way as to be capable of pivoting between the retracted position and the engagement position. At the time of a displacement of the rod 61 of the cylinder 6, the slide 17 is guided in translational movement by the guides 161a, 161b supported by the plate 14 that is integral with the body of the cylinder via the carrier plate 12. The guides 161a, 161b are constituted by plates applied to the columns 16a, 16b.

The slide 17 has a U-shaped form (FIG. 4), of which the bottom part is fixed to the rod 61 of the cylinder 6. The lateral uprights 17a, 17b of the U support the pivot shaft 9 for the articulation. These lateral uprights exhibit a complementary part 171a, 171b bearing against the guides 161a, 161b. The actuator 8 exhibits the form of a slightly bent connecting rod, of which the lower part is pivotally mounted on the shaft 9. Its upper part exhibits a cylindrical form 19 which will lodge in one of the hollow parts 110 arranged on the periphery of the wheel 10. The bottom part of the actuator 8 exhibits in the vicinity of the shaft 9 a surface 20 which will bear against a first fixed stop 21 that is integral with the plate 14 during a retraction movement of the rod 61 of the cylinder 6. Thus, during a movement towards the bottom of the rod 61, and thus of the slide 17, the actuator 8 is displaced towards the retracted position disengaged from the wheel illustrated in FIGS. 3a and 5a. The first stop 21 is situated on the side of the wheel 10. A spring 22 is arranged between the actuator 8 and the plate 14. It is positioned in the interior of a housing 23 provided in the actuator 8 on the side opposite the stop 21 in relation to the shaft 9. The spring pushes against a finger 24 that is slidably mounted in the housing 23. The finger 24 exhibits a bottom part 25 which projects towards the bottom out of the housing 23. The bottom part 25 normally rests on a supporting member 26 that is integral with the slide 17. Thus, during an extension movement (towards the top) of the rod 61, the spring 22 causes the actuator 8 to tilt towards the position of engagement with one of the drive members 11 in a hollow part 110 of the wheel 10 as illustrated in FIG. 5b. Conversely, during a movement of the rod 61 towards the bottom, the surface 20 comes into contact with the first stop 21 (FIG. 5a), the effect of which is to displace the actuator 8 towards the retracted position disengaged from the wheel 10.

Figure 5C:
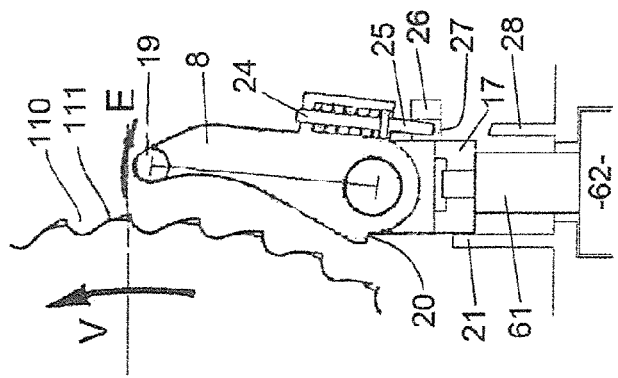
FIGS. 5a, 5b, 5c depict the actuator in different positions.
Figure 5B:
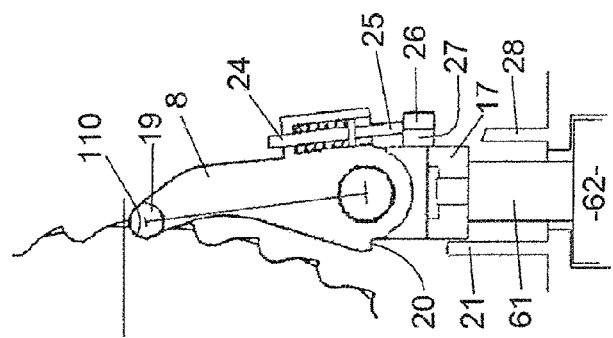

FIG. 5c illustrates the case in which, the rod of the cylinder 61 being in an extended position, the speed V of rotation of the shaft train 1 begins to increase, as is the case, for example, when the turbines are being driven by steam. In this case, an inclined part 111 of a driving means 11 will eject (arrow E) the cylindrical form 19 towards the exterior of the wheel 10. The actuator 8 then tilts towards the ejection position represented in FIG. 5c, in which the part 25 of the finger 24 pushed back by the spring 22 will lodge in a cavity 27 in the slide 17. Once it has lodged in this cavity 27, the finger 24 immobilizes the actuator 8 in the ejection position. Consequently, a movement of the finger 24, which is mounted movably in relation to the actuator 8, permits one part 25 of the finger to engage in the cavity 27 in the slide 17 in such a way as to immobilize the actuator 8 in the ejection position away from the wheel 10, thereby protecting the actuating mechanism 15 from any damage which may result from contact with the drive members 11.

Figure 5A:
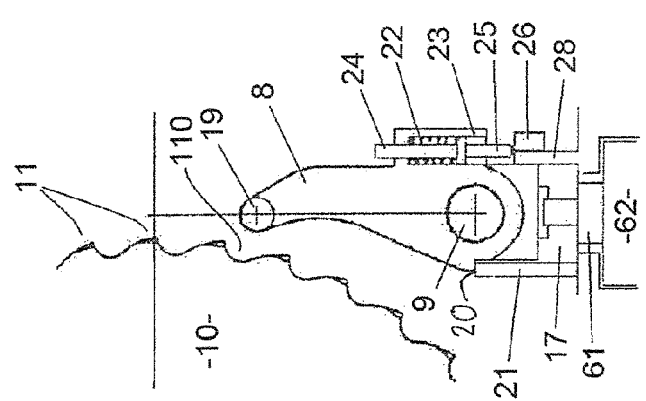

In conjunction with the retraction of the rod 61 as it leaves the position illustrated in FIG. 5c, the part 25 of the finger 24 enters into contact (FIG. 5a) with a second fixed stop 28 that is integral with the plate 14. The effect of the contact with this second stop 28 is to place the part 25 of the finger 24 in contact on the supporting member 26 (FIGS. 5a and 3). The actuating mechanism 15 is then ready to function normally as described in relation to FIGS. 5a and 5b. The second fixed stop 28 is arranged on the side opposite the first fixed stop 21 in relation to the rod 61.

In order to limit the movements of the slide 17, the actuating mechanism is provided with two end of travel detecting devices 31, 32.

Figure 6:
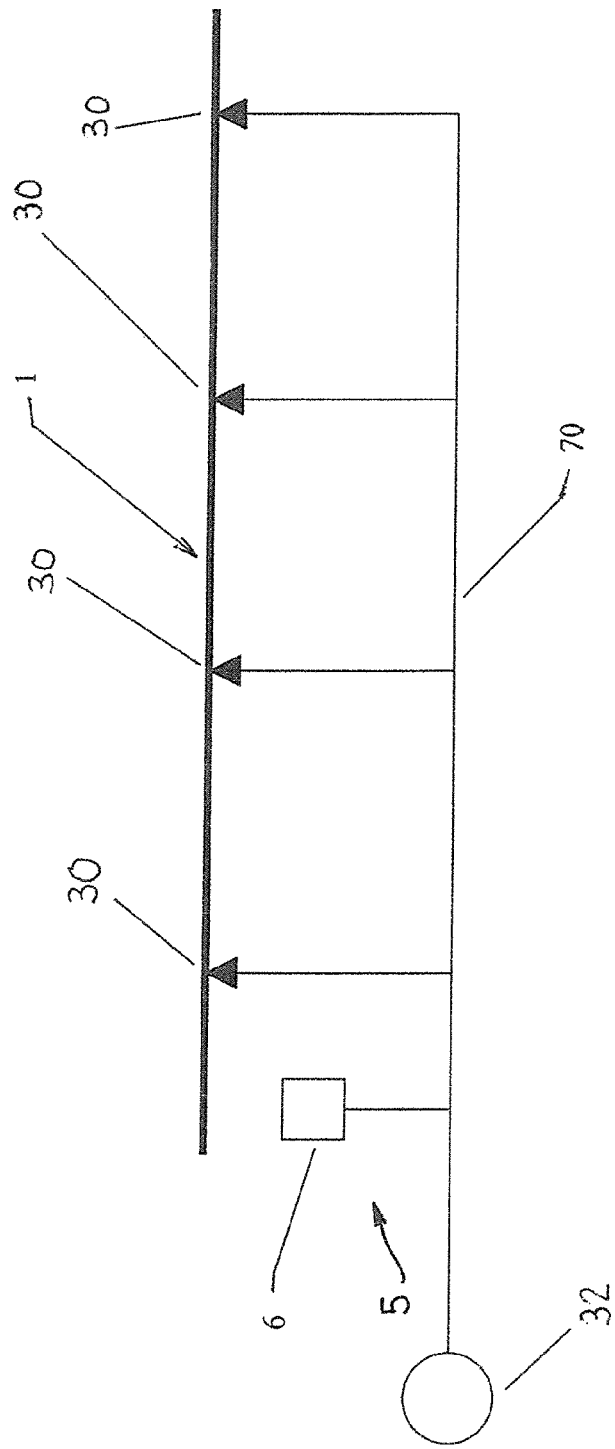
FIG. 6 shows an oil circuit under high pressure supplying the bearings of a shaft train.

Illustrated schematically in FIG. 6, identified here as 70, is an oil circuit under high pressure which supplies bearings 30 of the shaft train 1.

It can be appreciated that the auxiliary turning gear 5, in particular its hydraulic cylinder 6, is supplied with oil under high pressure by this circuit 70 for supplying oil to the bearings.

The rotor must be subjected to lifting during any turning phase. This lifting is achieved by the injection of oil under high pressure at the site of the bearings 30. The operation of the hydraulic cylinder 6 also requires an oil under high pressure.

For the sake of the simplification of the oil circuits, the high-pressure oil utilized by the cylinder 6 will arrive by preference from a pump 32 on the circuit 70 which permits the lifting of the shaft train, and all the more so given that this circuit is active when the cylinder is in operation, since it supplies oil to the bearings. It is understood, therefore, that this invention is not limited to the particular embodiments disclosed, but is intended to cover all modifications which are within the spirit and scope of the invention as defined by the appended claims; the above description; and/or shown in the attached drawings.

What is claimed is:

1. An actuating device for rotating a turbine shaft train, comprising:
   an electrically operated principal turning gear,
   a hydraulically operated auxiliary turning gear adapted to be controlled by a rod of a double-acting hydraulic cylinder;
   wherein the auxiliary turning gear includes,
   a wheel that is integral with the shaft train, and an actuator connected to the rod of the cylinder, wherein the actuator is configured to engage drive members arranged on a periphery of the wheel and configured to be displaced between a retracted position disengaged from the wheel and a position of engagement with one of the drive members, in which an extension movement of the rod of the cylinder controls the rotation of the wheel,
   the actuator being connected to the rod of the cylinder by an articulation supported by a slide that is integral with the rod of the cylinder in such a way as to be pivotable between the retracted position and the engagement position, wherein the slide has a U-shaped form including a bottom part fixed to the rod of the cylinder, and uprights that support a pivot shaft for the articulation; and
   a plurality of guiding plates supported by a plate that is integral with the cylinder, the plurality of guiding plates configured for guiding the slide in translational movement at a time of displacement of the rod of the cylinder, the plate including two columns,
   wherein the plurality of guiding plates are supported by the columns, such that each column has two guiding plates of the plurality of guiding plates, the two guiding plates connected to respective perpendicular faces of each column and the uprights of the slide have complementary guiding surfaces for complementing the plurality of guiding plates supported by the plate such that the slide is guided by the columns and the plurality of guiding plates on all sides parallel to a direction of the translational movement.

2. The actuating device as claimed in claim 1, wherein the actuator comprises:
   a surface which bears against a first fixed stop that is integral with the plate during a retraction movement of the rod of the cylinder in such a way as to displace the actuator towards said retracted position disengaged from the wheel.

3. The actuating device as claimed in claim 1, comprising:
   a spring configured to cause the actuator to tilt towards said position of engagement with one of the drive members of the wheel during a retraction movement of the rod of the cylinder.

4. The actuating device as claimed in claim 1, comprising:
   a finger mounted movably in relation to the actuator, a movement of the finger permitting one part of the finger to engage in a cavity in the slide in such a way as to immobilize the actuator in an ejection position away from the wheel.

5. The actuating device as claimed in claim 1, comprising:
   an oil circuit under high pressure, which supplies bearings of the shaft train, wherein the hydraulic cylinder of the auxiliary turning gear is supplied with oil under high pressure by said circuit for supplying oil to the bearings.

6. Turbine-generator set for the generation of electricity comprising,
   an actuating device for rotating a turbine shaft train, the actuating device including,
      an electrically operated principal turning gear, and
      a hydraulically operated auxiliary turning gear adapted to be controlled by a rod of a double-acting hydraulic cylinder;
   wherein the auxiliary turning gear includes,
   a wheel that is integral with the shaft train, and an actuator connected to the rod of the cylinder, wherein the actuator is configured to engage drive members arranged on a periphery of the wheel and configured to be displaced between a retracted position disengaged from the wheel and a position of engagement with one of the drive members, in which an extension movement of the rod of the cylinder controls the rotation of the wheel,
   the actuator being connected to the rod of the cylinder by an articulation supported by a slide that is integral with the rod of the cylinder in such a way as to be pivotable between the retracted position and the engagement position, wherein the slide has a U-shaped form including a bottom part fixed to the rod of the cylinder, and uprights that support a pivot shaft for the articulation; and
   a plurality of guiding plates supported by a plate that is integral with the cylinder, the plurality of guiding plates configured for guiding the slide in translational movement at a time of displacement of the rod of the cylinder, the plate including two columns,
   wherein the plurality of guiding plates are supported by the columns, such that each column has two guiding plates of the plurality of guiding plates, the two guiding plates connected to respective perpendicular faces of each column and the uprights of the slide have complementary guiding surfaces for complementing the plurality of guiding plates supported by the plate such that the slide is guided by the columns and the plurality of guiding plates on all sides parallel to a direction of the translational movement.

* * * * *